Nov. 20, 1945. W. F. PECK ET AL 2,389,544
OPTICAL TOOL GAUGE
Filed Nov. 19, 1941 2 Sheets-Sheet 2
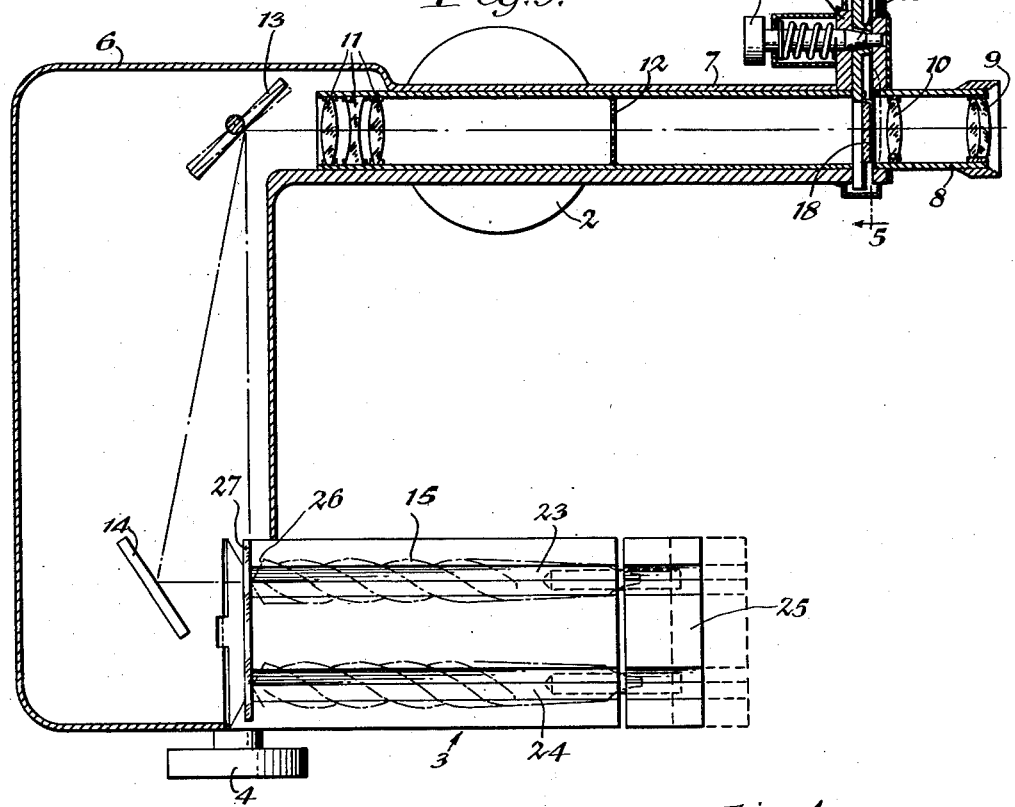
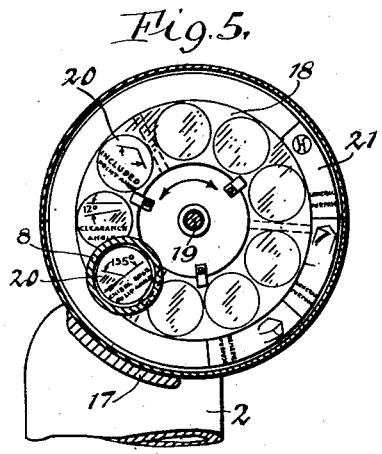
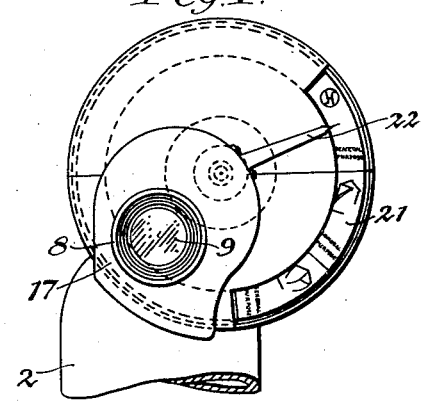
INVENTOR
WILLIAM F. PECK
GUSTAV E. GUELLICH
BY
ATTORNEY Patented Nov. 20, 1945

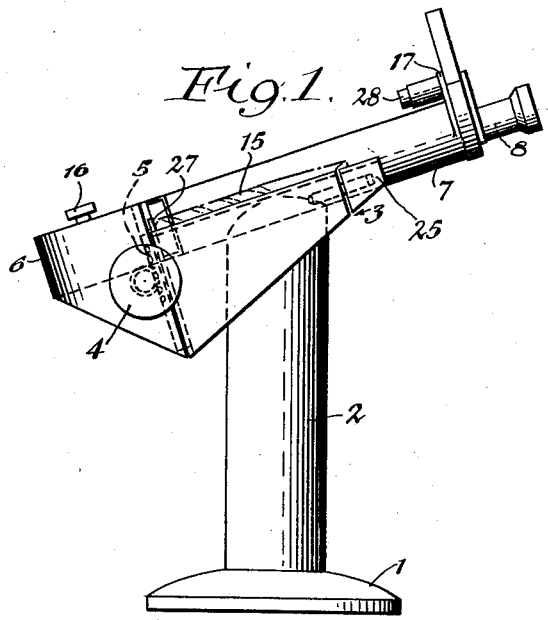
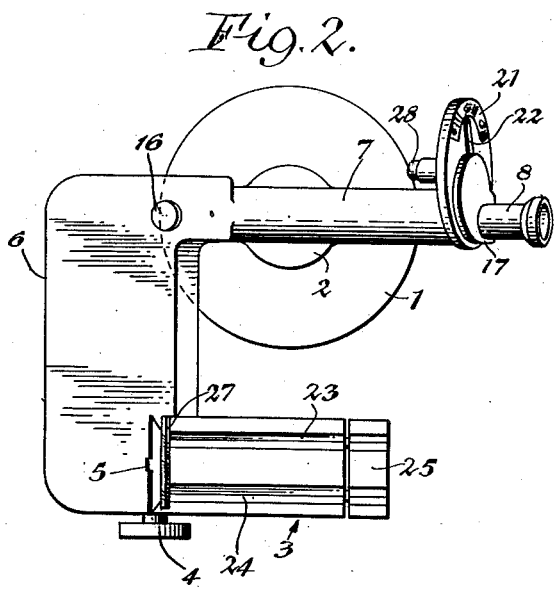

2,389,544

UNITED STATES PATENT OFFICE 2,389,544

OPTICAL TOOL GAUGE

William F. Peck, Snyder, and Gustav E. Guellich, Buffalo, N. Y., assignors, by mesne assignments, to American Optical Company, Southbridge, Mass., a voluntary association Application November 19, 1941, Serial No. 419,698

4 Claims. (Cl. 88—14)

This invention relates to optical instruments and has particular reference to a new and improved optical tool gauge.

An object of the present invention is to provide a new and improved tool gauge which is simple, efficient, and economical to manufacture and which is simple and efficient in operation.

Another object is to provide an optical tool gauge which will allow comparison of the tool with a standard.

Another object of the invention is to provide an optical tool gauge which allows observation of the tool from an end thereof and from the side or a position normal to the axis of the tool and the comparing of the image of the tool with a standard.

Other objects and advantages of the invention will be apparent from the following description taken in connection with the accompanying drawings and it will be understood that many changes may be made in the details of construction and arrangement of parts without departing from the spirit of the invention as expressed in the accompanying claims. We, therefore, do not wish to be limited to the exact details of construction and arrangement of parts shown and described as the preferred form has been shown by way of illustration only.

Referring to the drawings:

Fig. 1 is a side view of an optical tool gauge embodying the invention;

Fig. 2 is a top plan view thereof;

Fig. 3 is a sectional view on an enlarged scale;

Fig. 4 is a fragmentary front view thereof; and

Fig. 5 is a sectional view taken on line 5—5 of Fig. 3, looking in the direction of the arrows.

Although the present invention has been shown and described as applied to a device for observing and gauging twist drills, it is pointed out that the invention is not limited to use with such tools but that the device may be adapted for use with various tools and dies as desired, without departing from the invention.

In the prior art device for gauging tools the device comprised a magnifier or eyepiece, a standard on glass and a holder for holding the tool in contact with said standard outline. In such devices where the tool was brought into contact with the glass member containing the standard outline, the tool was liable to break, scratch or otherwise damage the standard outline member. Another difficulty with the prior devices was that where the tool to be gauged was a pointed tool or a similar device, as it was necessary to have the eyepiece focussed on the standard outline, it was not possible to focus the eyepiece on any part of the tool except the part which was in contact with the standard outline. Also, because of the positioning of the tool against the standard outline there was considerable difficulty in obtaining proper illumination.

It is, therefore, the object of the present invention to provide a tool gauge in which the tool is not placed in contact with the standard outline, and which is so constructed that the tool is so positioned with respect to the standard outline as to allow suitable illumination of the tool and which allows focusing on the point of the tool or on locations beyond this point.

Referring more particularly to the drawings wherein similar reference characters designate corresponding parts throughout the several views, the device shown embodying the invention comprises a base 1 on which is supported an upright 2 and at the upper end of the upright 2 is supported the tool gauge device.

The tool gauge device comprises a tool support 3 which is adapted to be raised or lowered to the desired height by means of the knob 4 which is adapted to move a pinion on the rack 5.

The tool gauge also comprises the casing 6, tube member 7 and eyepiece or ocular 8.

In the ocular or eyepiece 8 are the eye lens 9 and field lens 10. In the tube member 7 is the objective lens system 11 and telecentric stop 12 which is positioned between the objective system 11 and ocular 8 and in the rear focal plane of the objective system 11.

The adjustable mirror or reflector 13 is positioned in aligned optical relation with the eyepiece 8, and objective system 11. The reflector 14 is adapted to be in optical alignment with said reflector 13 and also with the end of the tool 15 on the tool support 3 when the tool is viewed from an end.

The mirror or reflector 14 is in fixed position in alignment with the end of said tool 15 and said reflector or mirror 13 is adapted to be rotated by rotating the knob 16 to optically align said reflector 13 with said fixed reflector 14 to direct an image of an end of the tool through the objective system 11, and tube 7 into the eyepiece 8.

Adjacent the forward end of the tubular member 7 is the supporting portion 17 adapted to support a standard or templet member 18 which gauge member is adapted to be removed by pulling the spring pressed plunger 28 which removes the pin 19 from the opening in said gauge member 18 or reticle and allows said reticle or gauge member 18 to be replaced with other desired standard or templet members, depending on the use to which the instrument is to be put.

The gauge member 18 is adapted to be rotated and is provided with an inner series of standards or templets 20 and an outer series of index members 21.

The gauge or standard members 20 and the index members 21 are so positioned on the standard or templet member 18 that the arrow or member 22 indicates on the index 21 the standard or templet which is at the time aligned with the ocular 8.

In using the device shown, a drill or other tool is placed in the groove 24 on the member 3 if it is desired to view the drill from the side or in the groove 23 if it is desired to view the drill from the end. The support 3 for the tool is provided with an extensible portion 25 which may be extended, as shown in dotted lines, to support the drill, depending on the length of said drill.

The drill is placed with its point 26 in contact with the transparent and removable stop member 27. This removable stop member 27 is removable to allow longitudinal adjustment of the tool for focussing an image of the desired portion of the tool on the standard.

If it is desired to view the drill from the front the reflector 13 is then moved to the position shown by dotted lines in Fig. 3 and an image of the end of the drill is then reflected by the fixed reflector 14 into the adjustable reflector 13 and through the objective system 11, the tube 7 and ocular 8 and said image projected into the plane of the standard outline 18 and superimposed on the corresponding standard outline 18 as indicated by the index pointer 22 on the index member 21 and the image of the end of the tool 15 is then compared with the templet or standard 20.

In the case of the twist drill shown, the drill would be viewed from the front when it is desired to check the angle of the chisel edge or the centricity of dead center.

If it is desired to view the drill from the side to check the included point angle or length of lip or clearance angle, the reflector 13 is rotated by means of the knob 16 until it is in the position shown by the full lines in Fig. 3 and an image of the side of the drill is then projected through the objective system 11, telecentric stop 12 and focussed in the plane of the standard or templet 18 and ocular 8, and the image is compared with the image on the desired standard or templet 20 in the same manner as described above.

It is pointed out that in the use of the instrument a proper source of external illumination is placed adjacent the tool support 3 in such a position as to form the desired image on the reflector 14 or 13, respectively, as the case may be or if desired a source of illumination may be provided within the casing 6.

From the foregoing it will be seen that we have provided simple, efficient and economical means for obtaining all of the objects and advantages of the invention.

Having described the invention, we claim:

1. An optical tool gauge for selectively viewing different portions of a tool or the like comprising the combination with means for supporting a tool to be gauged, of a viewing system for providing an aerial image of a portion of the tool selected to be gauged, said viewing system having a standard or gauge member inserted therein so as to be superposed on said aerial image, and a reflector system cooperating with said viewing system in forming said aerial image, one reflector of said system being aligned with said viewing system and a second reflector being arranged to reflect light from the tool to the first mentioned reflector, the reflector aligned with said viewing system being adjustable selectively for reflection of light received directly from a portion of the tool or for reflection of light received from said second reflector, said supporting means being provided with positioning means for disposing the tool so that a portion thereof is in optical alignment with the second reflector, and with additional positioning means for alternatively disposing the tool so that another portion thereof is in optical alignment with the adjustable reflector, the positioning means being so arranged that the length of the indirect light path from the first mentioned portion of the tool to the adjustable reflector is equal to that of the direct light path from the second mentioned portion of the tool to the adjustable reflector.

2. In an optical tool gauge, the combination with an optical system including an objective and an ocular for providing a magnified image of a portion of a tool or the like selected to be gauged, a standard or gauge member in said optical system for superposing a standard for comparison on said image, and a reflector system cooperating with said optical system in forming said image, one reflector of said reflector system being aligned with said optical system and a second reflector being arranged to reflect light from the tool to said first mentioned reflector, the reflector aligned with said optical system being adjustable selectively for reflection of light received directly from a portion of the tool or for reflection of light received from the second reflector, of supporting means for the tool or the like provided with positioning means for disposing the tool so that a portion thereof is in optical alignment with the second reflector, and with additional positioning means for alternatively disposing the tool so that another portion thereof is in optical alignment with the adjustable reflector, the positioning means being so arranged that the length of the indirect light path from the first mentioned portion of the tool to the adjustable reflector is equal to that of the direct light path from the second mentioned portion of the tool to the adjustable reflector.

3. In an optical tool gauge, the combination with a standard or gauge member, an optical system for superposing on said member an image of a portion of the tool selected to be gauged, and a reflector system cooperating with said optical system in forming said superposed image, one reflector of said reflector system being aligned with said optical system and a second reflector being arranged to reflect an end view of the tool to the first mentioned reflector, the reflector aligned with said optical system being adjustable selectively for reflection of a direct side view of the end portion of the tool or for reflection of the end view of the tool as received from the second reflector, of supporting means for the tool to be gauged disposed laterally of said optical system and provided with positioning means for disposing the tool so that an end thereof is in optical alignment with the second reflector, and with additional positioning means for alternatively disposing the tool so that a side portion thereof is in optical alignment with the adjustable reflector, the positioning means being so arranged that the length of the indirect light path from the end of the tool to the adjustable reflector is equal to that of the direct light path from the side portion of the tool to the adjustable reflector.

4. An optical tool gauge as set forth in claim 3 in which the positioning means of said tool supporting means are arranged to dispose the long dimension of the tool substantially parallel with the optical axis of said optical system.

WILLIAM F. PECK.
GUSTAV E. GUELLICH.